United States Patent Office 3,219,417
Patented Nov. 23, 1965

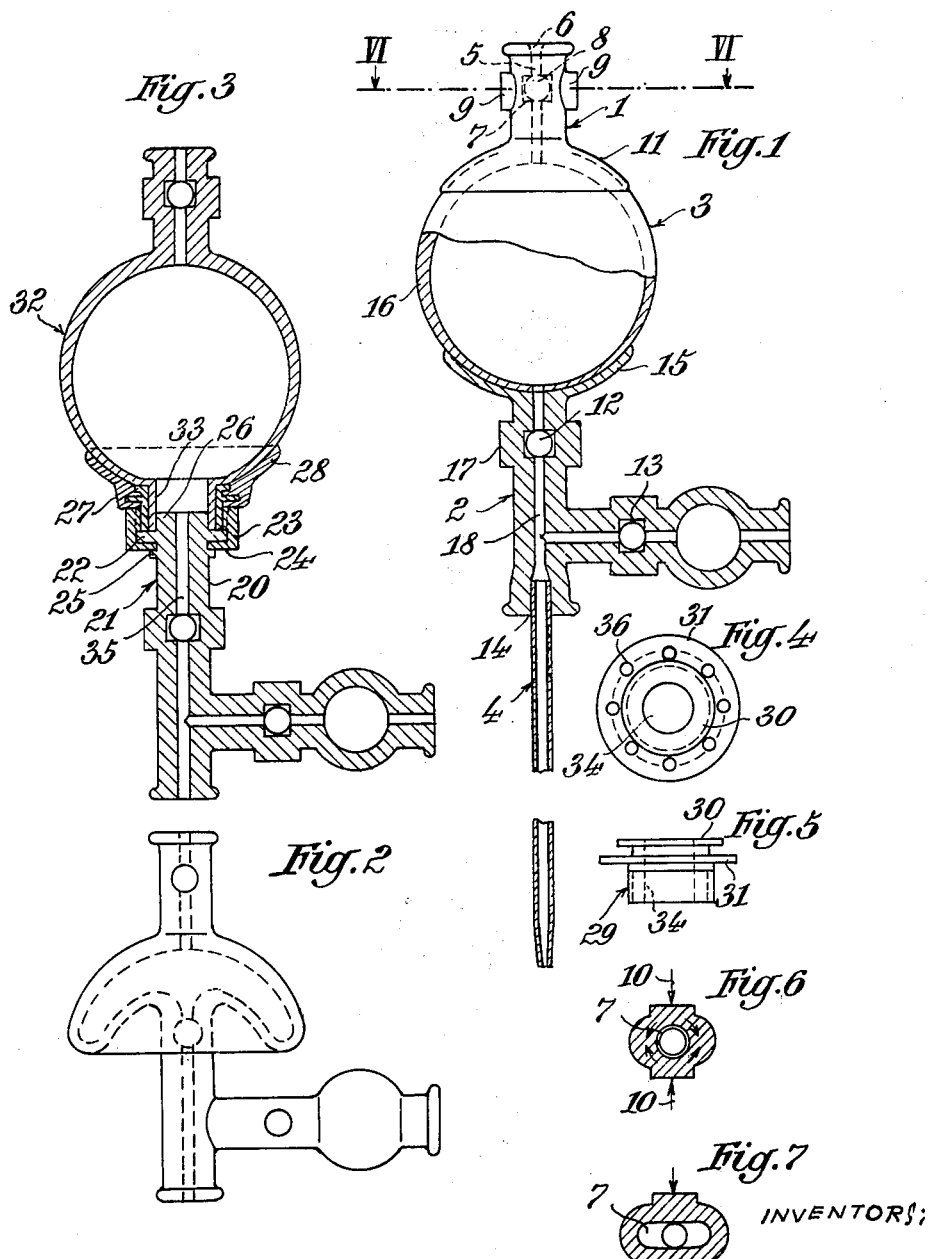

3,219,417
PIPETTING DEVICE
Alfred Klingbeil and Fritz Szezinsky, Berlin, Germany, assignors to Franz Bergmann K.G., Berlin-Zehlendorf, Germany
Filed Jan. 31, 1961, Ser. No. 86,053
3 Claims. (Cl. 23—259)

Pipetting devices are known which comprise a rubber ball, a pipetting tube which is introduced into a rubber tube connector attached to the rubber ball, and further rubber tubular duct members with built-in ball valves.

These known pipetting devices have the disadvantage that they can be cleaned only with difficulty. A further disadvantage is that after the rubber ball has been compressed to expel the air, the inherent resilience of the rubber ball is often insufficient to return the rubber ball to its original hollow spherical shape after release by the finger of the operator, and thereby to perform the action of sucking the liquid in through the pipetting tube.

In order to remove this disadvantage, the tube part on which the pipetting tube is located, is connected to the rubber ball by a screw connection. It is advisable so to shape the screw connection members and to provide these members with rubber coatings, more particularly on the portions facing the liquid, that after these two parts of the device have been screwed together no liquid can reach the screw connection members, which are preferably made of metal.

The screw connection comprises a cap nut which through the intermediary of a radial flange is arranged on the rubber tubular member accommodating the pipetting tube, and a threaded nipple which by means of one or more radial flanges is vulcanised directly into the wall of the rubber ball or alternatively into a separate cap which itself is vulcanised on to the rubber ball.

In order that the rubber ball after having been compressed will return with sufficient reliability to its original hollow spherical shape for the purposes of the actual suction operation, the wall of the ball is made with increasing wall thickness, in such a manner that the greatest wall thickness is disposed in the vicinity of one valve tube having a channel which leads into the interior of the rubber ball, whereas the smallest wall thickness is disposed in the diametrically opposite region of the rubber ball, the other rubber tube being attached to this region.

Further details of the invention will be more particularly described with reference to embodiments chosen by way of example and illustrated in the accompanying drawings, in which:

FIGURE 1 is a view, partly in side elevation and partly in axial section, of a pipetting device in which the two valve tubes and the rubber ball are all made integral with one another;

FIGURE 2 is an apparatus similar to that shown in FIGURE 1, in which the rubber ball has been released after being compressed;

FIGURE 3 shows another embodiment of a pipetting device, comprising two parts which are screwed together;

FIGURE 4 is a plan view of the threaded nipple of the screw connection shown in FIGURE 3;

FIGURE 5 is a side elevation of a threaded nipple as shown in FIGURE 4;

FIGURE 6 is a cross-section through one of the tubes in the region of the ball valve, in section on line VI—VI of FIGURE 1, in the unloaded state; and FIGURE 7 is the same section, during actuation of the valve by compression.

In the embodiment illustrated in FIGURES 1 and 2, the pipetting device consists of two valve tubes 1 and 2, a rubber ball 3 and a pipetting tube 4. One valve tube has a central channel 5; in the vicinity of its outer end this channel has a cylindrical widened portion 7, within which a valve ball 8 is mounted; the valve ball 8 is made of a rigid material such as agate, and its dimensions are such as to block the flow through the channel 5. Two flat projections 9 are disposed diametrically oppositely to one another on the outer wall of the valve tube 1, in the region of the cylindrical widened portion 7. If pressures in the directions of the arrows 10 are exerted on these two flat projections by two human fingers, then the originally cylindrical shape of the cylindrical recess 7 is flattened, as shown in an exaggerated way in FIGURE 7. In this manner, narrow slots between the ball surface and the channel walls are opened within the channel 5, so that air can pass through the channel 5. The valve tube 1 is connected to the ball by means of a hollow spherical cap 11 which is attached to the tube and vulcanised on to the ball.

The other valve tube 2 is formed as a branch pipe connector which has two valves 12 and 13 and a bottom orifice 14 into which the pipetting tube 4 is inserted. The valve tube 2 also has a cap 15 vulcanised on to the rubber ball 3. The wall 16 of the rubber ball 3 is thickest in the top part, i.e. in the region to which the top valve tube 1 is connected, and gradually decreases towards the region to which the bottom valve tube 2 is connected.

If the rubber tube is compressed while the top valve 8 is actuated at the same time, air is forced out through the channel 5 of the upper valve tube. If the rubber ball is released after compression of the ball has been completed, the ball then assumes the bell shape, symmetrical about the longitudinal axis of the device, which is shown in FIGURE 2. As tests have shown, this bell shape is particularly advtangeous for the subsequent suction operation, because this shape causes the resilient characteristics within the rubber ball to ensure that during the suction operation the ball will be gradually returned to the original hollow shape with the greatest possible force, uniformity and reliability. During, the suction operation the lower valve 12 is actuated; compressive forces directed diametrically towards one another are exerted on the two flat projections 17 of this valve by means of two human fingers. This opens the channel 18 of the valve tube 2, and liquid can be sucked in through the pipetting tube 4, as the bell shape 3 of FIGURE 2 gradually returns to the hollow spherical shape of FIGURE 1.

In order to permit satisfactory cleaning, more particularly of the inside of the rubber ball, in the embodiment shown in FIGURE 3 the top part 20 of the bottom valve tube 21 is provided with a radial flange 22, over which a cap nut 23, made of metal, engages. To prevent this cap nut from slipping downwards, an annular ridge 25 is provided on the valve tube below the bottom end surface 24 of this cap nut. Above the radial flange 22, the wall of the valve tube is prolonged to form a tubular connection 26.

A threaded nipple 29 has two radial flanges 30 and 31 which differ stepwise from one another in diameter; by means of these flanges the nipple is vulcanised into a projecting portion 27 of a cap 28 made of rubber; the flange 31 is provided with a series of holes 36 for more secure attachment. The cap 28 itself is vulcanised to the bottom portion of the rubber ball 32, in the region in which the rubber ball has the smallest wall thickness. In this region a cylindrical connecting pipe 33 is provided which is integral with the rubber ball and engages in the correspondingly large bore 34 of the threaded nipple 29 and is vulcanised on to the inner surface of the bore of the threaded nipple. By means of this construction, after the parts have been screwed together any liquid that gets into the interior of the rubber ball 32 through the channel 35 is reliably prevented from coming into contact with any parts of the metal screw connection.

In making the ball, the blowing process that was most commonly used heretofore is preferably avoided. Instead, the balls are made on a core which preferably consists of a special steel such as $V_{2a}$ or $V_{4a}$.

Instead of making the rubber balls and valve tubes from soft rubber, it is also possible to use a suitable synthetic material which after curing has the same resilient characteristics as vulcanised rubber.

In order to get a reliable and inextricable combination between the rubber consisting cylindrical connecting pipe 33 and the threaded nipple 29 during the vulcanising process, it is suitable to spread the corresponding parts of the threaded nipple 29 with a sticking glue which guarantees a solid rubber-metal combination.

We claim:

1. A pipetting device comprising, in combination, a rubber ball having a wall decreasing in thickness from top to bottom; also having a first opening on its top and a second opening at its bottom; a first valve tube integrally connected to the top of said rubber ball, said first valve tube having a central channel connecting with, and conforming to, said first opening thus providing a continuous opening for admittance and release of air; valve means disposed in said central channel; external means for manual actuation of said valve means on said first valve tube; a second valve tube detachably connected to the bottom of said rubber ball; screw means for connecting and detaching said second valve tube to and from said rubber ball; said second valve tube having a central channel connecting with, and conforming to, said second opening in said rubber ball thus forming a continuous opening; an extension disposed on said second valve tube substantially at a right angle thereto, said extension also having a central channel connecting with the central channel of said second valve tube; valve means in the central channel of said second valve tube above said extension; valve means in the central channel of said extension; external means for actuation of both said valve means; and a pipetting tube inserted in said central channel of said second valve tube.

2. The pipetting device as defined in claim 1, wherein said screw means comprise a cap nut flanged in said second valve tube; a threaded nipple integrally connected to the bottom of said rubber ball concentrically with said second opening; the threads of said nipple fitting said cap nut.

3. The pipetting device as defined in claim 2, wherein the internal parts of said screw means, which are exposed to the contents of said device, are rubber-coated.

References Cited by the Examiner
UNITED STATES PATENTS

| | | | |
|---|---|---|---|
| 56,596 | 7/1866 | Naglee | 23—259 |
| 2,172,575 | 9/1939 | Caulfield | 73—425.6 |
| 2,724,275 | 11/1955 | Persson et al. | 23—259 |
| 2,888,331 | 5/1959 | Carpenter | 23—253 |

FOREIGN PATENTS

| | | |
|---|---|---|
| 1,273,444 | 9/1961 | France. |
| 897,930 | 11/1953 | Germany. |

MORRIS O. WOLK, *Primary Examiner.*

MAURICE A. BRINDISI, *Examiner.*